Patented Jan. 2, 1951

2,536,833

UNITED STATES PATENT OFFICE 2,536,833

RECOVERY OF NAPHTHOQUINONE

Maurice E. Bailey, Orchard Park, N. Y., assignor to Allied Chemical and Dye Corporation, New York, N. Y., a corporation of New York No Drawing. Application September 18, 1948, Serial No. 50,009

6 Claims. (Cl. 260—396)

This invention relates to the treatment of mixtures containing naphthoquinone and, more particularly, refers to a new and improved process for recovering 1,4-naphthoquinone from a mixture of 1,4-naphthoquinone and crude phthalic acid.

In commercial manufacture of phthalic anhydride by catalytic oxidation of naphthalene vapors with air, 1,4-naphthoquinone is formed as a by-product. In order to condense the major portion of the phthalic anhydride vapors, the hot gases from the catalytic oxidation are cooled in condensers which are at a temperature somewhat above the dew point of the mixture with respect to water vapor in the gases. The condensate which is mostly phthalic anhydride contains naphthoquinone. The tail gases contain some phthalic anhydride vapors, vapors of naphthoquinone, of other acids and anhydrides such as benzoic acid and maleic anhydride, and water vapor. These tail gases are passed through water scrubbers, and their water-soluble compounds form more or less saturated solutions of acids from which phthalic acid particularly separates in crystal form, to mingle with substantially insoluble particles of 1,4-naphthoquinone which are formed by cooling from the naphthoquinone vapors in the scrubbed gases. Filtration of such scrubbing slurries yields mixtures containing substantial amounts of solid phthalic acid and naphthoquinone.

Several methods for recovering naphthoquinone from such mixtures have been proposed. According to one method, the mixture is extracted in the presence or absence of water with a solvent like benzene, in which the naphthoquinone is soluble but the phthalic acid is insoluble (35 Industrial and Engineering Chemistry (1943) 279 to 288). This method is cumbersome due to the use of expensive and flammable solvent, and only moderately effective. Another recent method involves extraction of the mixture of naphthoquinone and phthalic acid or anhydride with an aqueous alkali, such as sodium carbonate, from which the insoluble naphthoquinone is separated by filtration in impure form, which may be purified by recrystallization from an organic solvent. This method is disclosed by Fierz-David et al. at 30 Helvetica Chemica Acta (1947) 262–263, where it is noted that the recrystallized product is described as "yellow green" and as having a melting point of 122° to 123° C.

While extraction with aqueous alkalies is potentially the cheapest and most convenient method for recovering naphthoquinone from mixtures containing phthalic acid and anhydride, this method when applied as described in the prior art literature, causes deterioration of naphthoquinone and does not produce naphthoquinone in sufficiently pure form to be acceptable for some commercial purposes.

One object of the present invention is to provide an efficient method for the recovery of naphthoquinone from mixtures containing phthalic acid and naphthoquinone.

Another object of the present invention is to provide an economical process for recovering 1,4-naphthoquinone in good yield and quality from tail gases of catalytic oxidation of naphthalene for phthalic anhydride.

Other objects and advantages of the invention will be apparent from the following description.

I have discovered a simple means of recovering high-grade, substantially pure 1,4-naphthoquinone from a mixture of 1,4-naphthoquinone and crude phthalic acid such as is obtained by water scrubbing the gaseous reaction products resulting from the catalytic oxidation of naphthalene vapors, which comprises subjecting an aqueous mixture containing naphthoquinone and phthalic acid or phthalic anhydride to treatment with an alkali metal compound which is less basic than sodium carbonate but sufficiently basic to form a water soluble alkali metal salt of phthalic acid while maintaining the mixture under non-alkaline conditions, i. e. at a pH not exceeding 7, and separating the undissolved 1,4-naphthoquinone from the solution. Examples of suitable alkali metal compounds which are less basic than sodium carbonate but sufficiently basic to form the acid salt of phthalic acid are sodium bicarbonate, disodium phthalate and disodium phosphate. My preferred alkali metal compound is sodium bicarbonate.

An essential feature of the invention is the maintenance of the naphthoquinone-phthalic acid mixture under non-alkaline conditions during the treatment with the alkali metal compound in order to minimize degradations of the naphthoquinone. Even local alkaline areas of appreciable magnitude in the naphthoquinone-phthalic acid slurry during neutralization with the weak basic salt were found detrimental to the recovery of good yields of high quality naphthoquinone. In the practice of my invention I have found it convenient to avoid alkaline areas by rapidly dispersing the alkali metal compound in the naphthoquinone-phthalic acid mixture in any conventional manner as for example by adding the weak alkali in solid or liquid form to a vigorously agitated mixture of naphthoquinone and phthalic acid at so slow a rate that the alkali is distributed and neutralized by acid within the treated mixture with great rapidity so that the existence for more than a few seconds of an alkaline area in the agitated mixture is substantially avoided.

The temperature for carrying out the process of the present invention does not appear critical. The process has been conducted at temperatures ranging from average atmospheric temperature up to about 100° C. without detection of detrimental effect due to such temperature.

Concentration of phthalic acid-naphthoquinone in the solution treated with the weak alkali may be varied widely, it being desirable to have a slurry sufficiently thin to permit rapid agitation to distribute the weak alkaline salt therethrough and sufficiently dilute to keep the resulting partially neutralized acids completely in solution.

Sodium bicarbonate in admixture with phthalic acid-naphthoquinone solutions frequently causes foaming which may be inhibited by the addition of a non-reactive water soluble agent, as for example a commercial detergent comprising about 35% sodium alkyl aryl sulfonate and about 65% sodium sulfate. An effective amount of such detergent is about 0.2 part per 100 parts phthalic acid to be neutralized.

The following example, in which parts are by weight and temperatures are in degrees centigrade, illustrates the invention.

*Example 1*

A wet filter cake containing 22% phthalic acid and 16.6% 1,4-naphthoquinone, was prepared from the aqueous scrubbing mixture of a vapor-phase catalytic air oxidation of naphthalene. A slurry of 450 parts of the filter cake in 1000 parts water was heated to 80°. To this hot, rapidly agitated slurry, 50 parts of powdered sodium bicarbonate were added in small portions, at a rate which caused little foaming, and permitted the bicarbonate to be substantially instantly dispersed through and decomposed in the rapidly agitated solution. After the last addition of bicarbonate the aqueous mass was agitated for about one hour to assure complete uniformity, as indicated by a maintained pH between 4 and 5.

The slurry was then cooled to 30° and filtered. The filter cake of naphthoquinone was washed with about its own volume of cold water, to displace mother liquor therein. The washed cake was dried in the usual manner. The dry 1,4-naphthoquinone thus recovered was yellow in color, weighed 73 parts, and had a melting point of 124°.

From the foregoing example, in accordance with the practice of my invention, it will be seen that naphthoquinone may be recovered directly from phthalic acid mixtures in excellent yield and a high state of purity without using any organic solvent and without recrystallizations from organic solvents.

A comparative test was performed in which another 450 parts portion of the wet phthalic-naphthoquinone cake used in Example 1 was treated in all but one respect exactly as in Example 1, that is, instead of 50 parts sodium bicarbonate, 32 parts of finely powdered soda ash were added. The dry 1,4-naphthoquinone finally recovered was yellowish-green, weighed 71 parts and had a melting point of 122°.

The smaller yield, lower melting point and different color of 1,4-naphthoquinone in the comparative example just referred to compared with the yield, melting point and color of the naphthoquinone of Example 1 in accordance with the present invention are symptomatic of the degraded quality of the naphthoquinone which accompanies the use of sodium carbonate.

Although certain preferred embodiments of the invention have been disclosed for purpose of illustration, it will be evident that various changes and modifications may be made therein without departing from the scope and spirit of the invention which is not to be limited save as defined in the appended claims.

I claim:

1. A process for the recovery of naphthoquinone from a mixture of naphthoquinone and phthalic acid which comprises subjecting a mixture containing naphthoquinone and phthalic acid to treatment in the presence of water with an alkali metal compound selected from the group consisting of sodium bicarbonate, disodium phthalate and disodium phosphate while maintaining the mixture under non-alkaline conditions, i. e. at a pH not exceeding 7, and separating the undissolved naphthoquinone from the solution of alkali metal phthalate.

2. A process for the recovery of naphthoquinone from a mixture of naphthoquinone and phthalic anhydride which comprises subjecting a mixture containing naphthoquinone and phthalic anhydride to treatment in the presence of water with an alkali metal compound selected from the group consisting of sodium bicarbonate, disodium phthalate and disodium phosphate while maintaining the mixture under non-alkaline conditions, i. e. at a pH not exceeding 7, and separating the undissolved naphthoquinone from the solution of alkali metal phthalate.

3. A process for the recovery of naphthoquinone from a mixture of naphthoquinone and phthalic acid which comprises adding an alkali metal compound selected from the group consisting of sodium bicarbonate, disodium phthalate and disodium phosphate to an aqueous naphthoquinone-phthalic acid mixture, rapidly dispersing the alkali metal compound in the mixture to reduce alkaline areas in the mixture, maintaining the mixture undergoing treatment under non-alkaline conditions, i. e. at a pH not exceeding 7, and separating the undissolved naphthoquinone from the solution of alkali metal phthalate.

4. A process for the recovery of naphthoquinone from a mixture of naphthoquinone and phthalic acid which comprises subjecting said mixture in the presence of water to treatment with sodium bicarbonate while maintaining the mixture under non-alkaline conditions, i. e. at a pH not exceeding 7, and separating the undissolved naphthoquinone from the solution of water soluble sodium phthalate.

5. A process for the recovery of naphthoquinone from a mixture of naphthoquinone and phthalic acid which comprises subjecting said mixture in the presence of water to treatment with disodium phthalate while maintaining the mixture under non-alkaline conditions, i. e. at a pH not exceeding 7, and separating the undissolved naphthoquinone from the solution of water soluble sodium phthalate.

6. A process for the recovery of naphthoquinone from a mixture of 1,4-naphthoquinone and crude phthalic acid such as is obtained by water scrubbing the gaseous products resulting from the catalytic oxidation of naphthalene vapors which comprises adding sodium bicarbonate to an aqueous mixture of 1,4-naphthoquinone and crude phthalic anhydride, rapidly dispersing the sodium bicarbonate in the mixture to reduce alkaline areas therein, maintaining the mixture undergoing treatment under non-alkaline conditions, i. e. at a pH not exceeding 7, and separating the undissolved 1,4-naphthoquinone from the solution of water soluble sodium phthalate.

MAURICE E. BAILEY.

REFERENCES CITED

The following references are of record in the file of this patent:

Fierz-David, Helv. Chim. Acta 30, 262–263 (1947).